Nov. 24, 1959 K. GANZHORN ET AL 2,914,754

MEMORY SYSTEM

Filed Feb. 26, 1957 2 Sheets-Sheet 1

INVENTORS
KARL GANZHORN
THEODOR EINSELE
HANS BORNHAUSER

BY Edward S. Drake
AGENT

*INVENTORS*
KARL GANZHORN
THEODOR EINSELE
HANS BORNHAUSER
BY Edward S. Drake
*AGENT*

2,914,754

MEMORY SYSTEM

Karl Ganzhorn and Theodor Einsele, Sindelfingen, and Hans Bornhauser, Boblingen, Germany, assignors to International Business Machines Corporation, New York, N.Y., a corporation of New York Application February 26, 1957, Serial No. 642,488

Claims priority, application Germany March 17, 1956

11 Claims. (Cl. 340—174)

This invention relates to magnetic core storage devices and more particularly to matrix storage devices capable of storing true and complementary values.

Two dimensional core matrix storage devices with fixed word length and address selection means for columns and rows are known in the art. The magnet cores forming such devices are made of material having a substantially rectangular hysteresis curve characteristic. Conventionally core matrix storage devices are linear in form, with the number of drivers constituting the row and column address selection means being determined by the size of the word and the quantity of words to be stored. Within the linear matrix system itself certain problems and limitations are generally recognized.

Therefore, the principal object of this invention is to provide an improved linear core matrix storage system that reduces driver requirements and simplifies address selection.

Another object of this invention is to provide a magnetic core matrix system wherein the read pulses of a certain column simultaneously serve as half write pulses for the preceding column.

Another object is to provide magnetic core matrix system wherein storage or writing is accomplished by column and row pulses and reading is accomplished only by column pulses.

Still another object is to provide a magnetic core matrix system wherein reading and writing are in true or complementary form.

Other objects of the invention will be pointed out in the following description and claims and illustrated in the accompanying drawings, which disclose, by way of examples, the principle of the invention and the best mode, which has been contemplated, of applying that principle.

Figure 1:
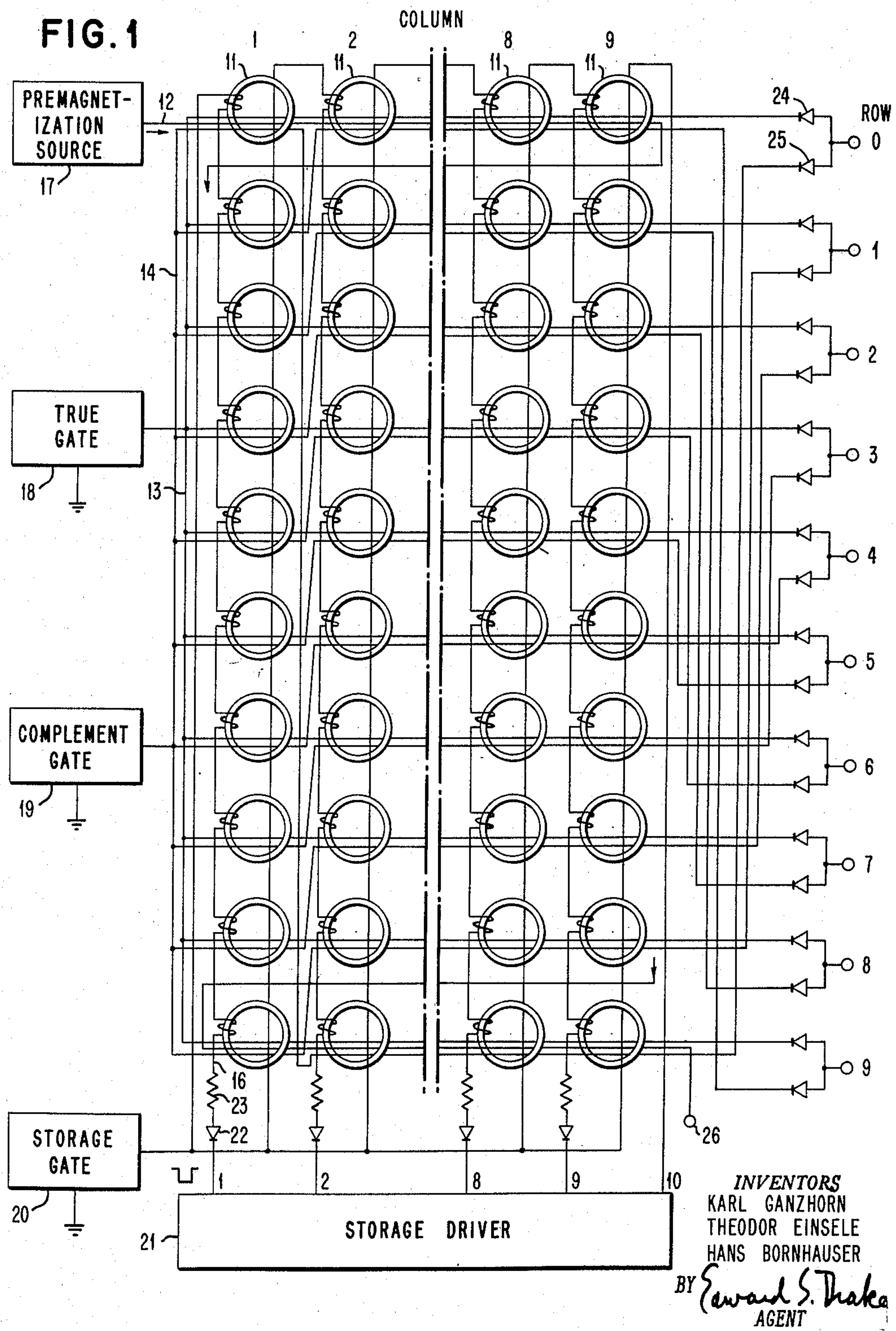
Fig. 1 illustrates a linear magnetic core matrix system in accordance with the invention.

As illustrated in Fig. 1, the cores are arranged in a two-dimensional matrix system of nine columns and ten rows. Such an arrangement permits the storage of a word having a length of nine decimal digits or eight digits and a sign. It is clear that the length of the word may be increased by simply adding columns of magnetic cores.

Each core 11 has a plurality of conductors therethrough. Shown in the horizontal direction are conductors 12, 13 and 14, and in the vertical direction is conductor 16. The premagnetization conductor 12 passes in a zigzag fashion through all the rows. Conductor 16, which is energized by driver 21, is shown as a winding of a few turns in order that a pulse of sufficient magnitude might be formed during a readout operation.

Line 12 is shown terminating at output terminal 26, which may be connected to another core matrix or simply grounded. The output voltage is taken from the true conductor 13 and the complementary conductor 14, both of which also perform a writing function. The latter conductors 13 and 14 could also take the form of a winding having a few turns, if it is desired to develop a higher output voltage and a lower half write current.

The single premagnetization conductor 12 is energized by a D.C. potential provided by any conventional source 17. The energization of parallel-connected conductors 13 (for true storage) and 14 (for complement storage) is controlled by conventional gates 18 and 19, which may take the form of a manual switch or electronic circuitry. Conductors 13 pass through the row cores representing the true value of all order digits, whereas conductors 14 pass through row cores representing the tens complement value of the digits in each order. Whether a value is to be written and read as true or complementary depends on which gate 18 or 19 is On or operating at the time. Storage gate 20, which also may take any conventional form, permits the energization of conductor 16, which is associated with a different column of the matrix.

Storage driver 21 may take the form of a chain of blocking oscillators capable of developing voltage pulses of negative polarity and calibrated amplitude. These pulses are produced in serial fashion beginning with column 1. Actually ten such pulses are required for each readout cycle, since the tenth pulse serves as a half write pulse for column 9. The required magnitude of the read pulses is obtained by a winding of two turns. The same conductor which forms the windings for readout afterwards passes in the opposite direction through the preceding column of cores with one turn thus forming simultaneously the half-write pulse. The negative pulse developed by storage driver 21 is coupled by a diode 22 and a resistor 23 to all the core windings of that particular column. The half write current is capable of being placed at the desired value by the calibrated voltage amplitude of the blocking oscillators and the resistors 23.

At the right of Fig. 1 are ten input/output terminals, each connected to two diodes 24 and 25. Diode 24 permits writing and reading the true number, whereas diode 25 controls writing and reading the tens complement of a number. Diode 24 of each input order is associated with all the cores in the row corresponding to that input order. On the other hand, diode 25 of each input order is associated with the core of column "1" in the row corresponding to the tens complement and with the cores of columns "2" to "9" corresponding to the nines complement of the particular input order.

In the case of true storage, diode 24 of the "3" input position, for example, is associated with the third row of cores, and brings about the storage of a digit "3" in any column selected by storage driver 21, provided that true gate 18 is On at the time. For complementary storage, diode 25 of row "3" is associated with the row "6" cores of columns "2" to "9" and the row "7" core of column "1." Therefore, a digit "7" is stored in column "1" or a digit "6" in any other column selected by storage driver 21 provided that gate 19 is On at the time.

Figure 2:
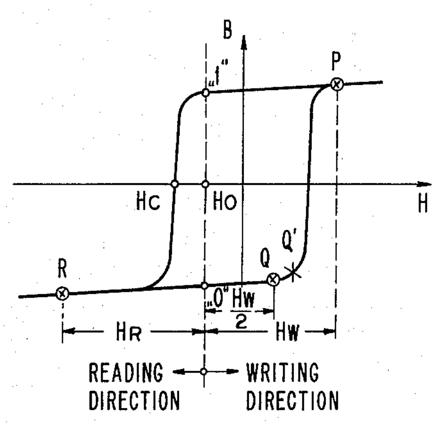
Fig. 2 is a hysteresis loop illustrating the character of magnetization of the storage cores.

The magnetization conditions for the disclosed core arrangement are somewhat different from the common coincidence matrix arrays. This results from the fact that coincidence selection of the cores must be provided only for writing. Since no row selection is required for reading there are no half read pulses in the disclosed arrangement. The cores are premagnetized with a constant field *Ho* (Fig. 2) in the direction of reading. With presently available cores, this gives improved tolerance conditions for the half write pulses $$\frac{Hw}{2}$$

Without premagnetization, when point P is reached by applying two half write pulses, one half write pulse brings the magnetization point Q, very near the edge of the hysteresis loop. However, with pre-magnetization the point Q of one half write pulse lies to the left of $Q^1$ where the change of magnetization is not so serious as at point $Q^1$.

For reading out of storage, pulse $H_R$ is delivered through the selected column conductor 16 without the requirement of any other coincidence pulse. This means that the amplitude of $H_R$ can be high, thereby resulting in an increased amplitude of the output pulses. The use of high reading pulse amplitudes and premagnetization increases the output voltage and decreases the switching time, thereby permitting the use of ferrite cores with low coercive force.

Figure 3:
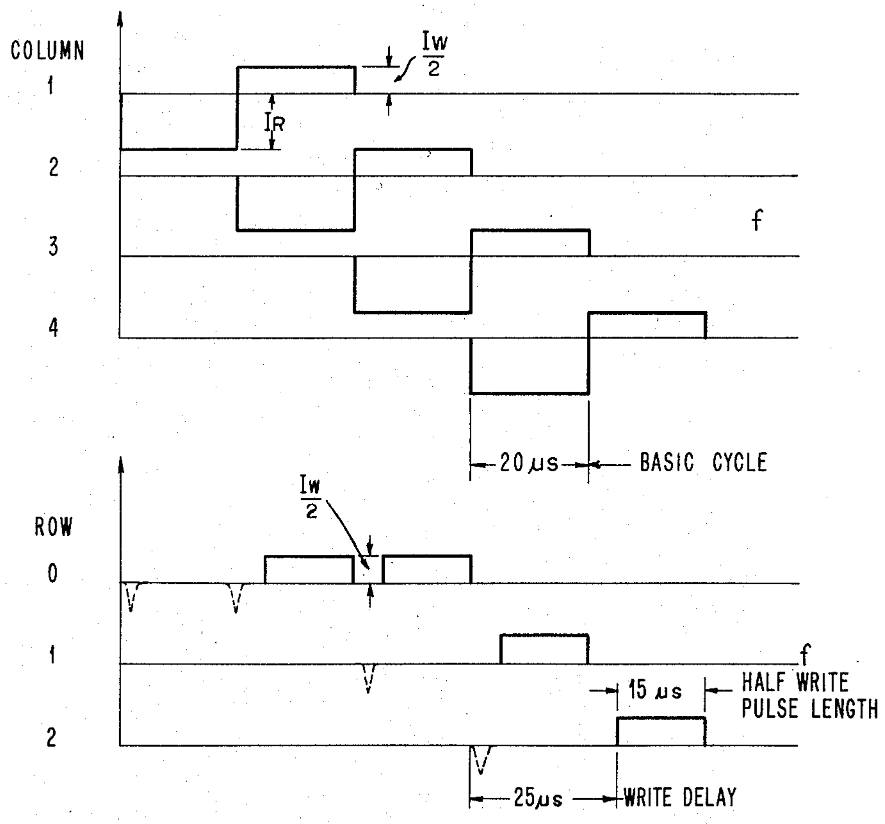
Fig. 3 illustrates the relative pulse situation in a hypothetical reading operation.

Fig. 3 illustrates the time relationship between the half-write current and the reading current for a hypothetical situation in which a previously stored number 2,100 is to be read out. The number is stored in the first four columns, as shown in Fig. 3. The voltage pulses developed by storage driver 21 are shown in the top group, and the half write pulses are shown in the bottom group in Fig. 3. The negative readout pulses are shown in dotted lines in the bottom portion of Fig. 3. Although Fig. 3 illustrates half-write pulses each for a specific true digit representing core in the preceding column, actually half-write pulses are provided for all the cores in the preceding column. However, since we are assuming a rewrite operation, only these pulses are of interest. The half-write current pulse $$\frac{IW}{2}$$

is shown to be half the read current pulse $I_R$. With regard to the columnar pulses of Fig. 3, it has been assumed that a group of conventional blocking oscillators form driver 21. In such a case the trailing edge of the pulse developed by the first blocking oscillator fires the second blocking oscillator, and so on. It is understood that the premagnetization input 17, true gate 18 and storage gate 20 are On at this time.

During the first basic cycle of, for example, 20 μs, the pulse developed by driver 21 reads out the lowest order digit "0" from the first column. The second pulse of driver 21 reads out another "0" from the second column and simultaneously produces a half write pulse in the first column. When the readout from the second column, lasting about 2–3 μs, is finished, writing a new value or rewriting the old value in the first column may be accomplished. It is noted that the readout pulse developed by storage driver 21 is negative in character, and therefore capable of read out on the true and complementary lines through respective diodes 24 and 25 during the time interval that positive writing pulses are not available at the input of diodes 24 and 25. The readout negative pulse is necessarily of short duration. This means that for regenerating the old value 25μs is provided, or a time greater than the basic cycle time. The same 25 μs delay is used to store a new value. During this time the entry of a new digit representing current pulses through the selected row of cores and the half write pulse will double the current for the selected core in the first column and store the desired digit. The half-write current pulse alone is incapable of changing the state of the core but this pulse plus the input row pulse are capable of achieving this result. It is recognized that the same row current flows through all the row cores, but that only the row core of the first column is affected. The time available for writing is about 15 μs, which is sufficient to switch over the cores with a low coercive force and long switching time.

Returning to our hypothetical reading situation represented by Fig. 3, the third pulse from driver 21 reads out "1" from the third column and produces a half write pulse for the second column. The next pulse reads out a "2" from the fourth column and provides a half write pulse for the preceding column. The fifth pulse (not shown) does not read out any value, but simply serves to provide a half write pulse for the fourth column.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A memory system comprising a plurality of magnetic cores arranged in columns and rows, in which each magnetic core is formed of the material having a substantially rectangular hysteresis curve characteristic, input means for entering data representing pulses into row cores corresponding to the true and complementary form of said data representing pulses, means connected to said input means for determining whether whether data storage is to be in true or complementary form, and driving means for controlling the columns in which said true and complementary data are stored.

2. A memory system comprising a plurality of magnetic cores arranged in columns and rows, in which each magnetic core is formed of the material having a substantially rectangular hysteresis curve characteristic, input means for entering data representing pulses into row cores corresponding to the true and complementary form of said data representing pulses, means connected to said input means for determining whether data storage is to be in true or complementary form, and driving means for controlling the columns in which said true and complementary data are stored with said columnar driving means cooperating with said input means for entering data into desired locations of said memory system and with said columnar driving means alone serving to readout the true or complementary data previously entered into said memory system.

3. A storage unit comprising a plurality of magnetic cores arranged in columns and rows, in which each magnetic core is formed of the material having a substantially rectangular hysteresis curve characteristic, a core in each column being provided for storing a certain value, a first winding for entering a true value into each row of cores, a second winding for entering the complement value into row cores forming the tens complement of the value entered through said first winding, input means for energizing said first and second windings simultaneously with value representing electric pulses, a third winding for reading and writing the true and complementary values in each column, and means for sequentially energizing each of said third windings during the reading and writing operations, with said third winding in any column serving to provide a half write pulse for all the cores in the preceding column during a reading operation.

4. A storage unit comprising a plurality of magnetic cores arranged in columns and rows, in which each magnetic core is formed of the material having a substantially rectangular hysteresis curve characteristic, a core in each column being provided for storing a certain value, a first winding for each column of cores, means for energizing each of said first windings sequentially proceeding from the lowest column to the highest column, a second winding connected through all the column and row windings for pre-magnetizing said cores, means for energizing said second winding with a constant current of a predetermined magnitude, a third winding for entering a true value into each row of cores, a fourth winding for entering the complement value into row cores from the tens complement of the value entered through said third winding, input pulse means connected to pairs of said third and fourth windings for writing simultaneously with true and complement value of the input number, and means connected to all said third and fourth windings for controlling true and complementary reading and writing in said storage unit.

5. A storage system having a plurality of magnetic cores arranged in columns and rows, in which each magnetic core is formed of the material having a substantially rectangular hysteresis curve characteristic, a core in each column being provided for storing a certain value, a first winding for storing and reading values in columns, means for sequentially energizing each of said first windings starting from the lowest column and proceeding to the highest column, a second winding for entering a true value into each row of columns, a third winding for entering the complement value into the row cores, input means for energizing said first and second windings simultaneously, and independently operating means connected to said first and second windings for controlling storage in true and complementary form.

6. A storage system having a plurality of magnetic cores arranged in columns and rows, in which each magnetic core is formed of the material having a substantially rectangular hysteresis curve characteristic, a core in each column being provided for storing a certain value, comprising a first winding associated with all the cores in each column, means for sequentially driving each of said first windings in a predetermined manner, a second winding associated with all of the cores in each row for entering the true value into the storage system, a third winding associated with the row cores forming the tens complement of the value entered through said second winding for entering the complement value into said storage system, and input means for energizing said first and second windings simultaneously with said second or third winding and said first winding cooperating to enter information into said storage system and said first winding alone accomplishing readout from said storage system.

7. A storage system having a plurality of magnetic cores arranged in columns and rows, in which each magnetic core is formed of the material having a substantially rectangular hysteresis curve characteristic, a core in each column being provided for storing a certain value, comprising a first winding for storing and reading out values sequentially in all columns, means for sequentially energizing each of said first windings starting from the lowest column and proceeding to the highest column, a second winding for entering a true value into each row of cores, a third winding for entering the complement value into row cores forming the tens complement of the value entered through said first winding, and input means for energizing said first and second windings simultaneously.

8. The invention according to claim 7 wherein a single gating means is associated with a plurality of first windings for resetting said storage system.

9. The invention according to claim 7 wherein pairs of said first and second windings are connected to a different input means through parallel connected diodes.

10. The invention according to claim 7 wherein said first winding in each column is connected through a parallel connected diode resistance arrangement to the output of said driving means.

11. The invention according to claim 7, characterized by a single fourth winding associated with all the cores in the direction of reading to provide an output value signal, in true or complementary form, of sufficient magnitude.

References Cited in the file of this patent

Publication I: "Thesis on Magnetic Cores," by M. K. Haynes, Dec. 28, 1950, pages 21 to 28, 36 to 45.